US008189499B2

(12) United States Patent
Joung et al.

(10) Patent No.: US 8,189,499 B2
(45) Date of Patent: May 29, 2012

(54) CROSS-LAYER OPTIMIZATION METHOD FOR CONTROLLING BIT RATE OF VIDEO CODEC IN TRANSMISSION OF VIDEO DATA IN WIBRO SYSTEM

(75) Inventors: Do-Young Joung, Seoul (KR); Tae-Sung Park, Yongin-si (KR); Jae-Hoon Kwon, Seongnam-si (KR); Sung-Kee Kim, Suwon-si (KR); Yong-Gyoo Kim, Seoul (KR); Si-Hai Wang, Suwon-si (KR); Chang-Hyun Lee, Seoul (KR)

(73) Assignee: Samsung Electronics Co., Ltd., Maetan-dong, Yeongtong-gu, Suwon-si, Gyeonggi-do (KR)

(*) Notice: Subject to any disclaimer, the term of this patent is extended or adjusted under 35 U.S.C. 154(b) by 1071 days.

(21) Appl. No.: 12/107,817

(22) Filed: Apr. 23, 2008

(65) Prior Publication Data
US 2008/0259834 A1 Oct. 23, 2008

(30) Foreign Application Priority Data
Apr. 23, 2007 (KR) .......................... 10-2007-0039530

(51) Int. Cl.
*H04B 7/00* (2006.01)

(52) U.S. Cl. ........ 370/310; 370/241; 370/252; 709/230; 709/231; 725/62; 725/105; 725/118; 725/121; 725/123; 375/240.01; 375/240.02; 375/240.03; 375/240.04; 375/240.05

(58) Field of Classification Search .................. 370/235, 370/252; 709/231; 725/62, 105–134; 375/240.01–240.26
See application file for complete search history.

(56) References Cited

U.S. PATENT DOCUMENTS

| 2006/0095401 A1* | 5/2006 | Krikorian et al. ................ 707/1 |
| 2007/0019668 A1* | 1/2007 | Lee et al. ..................... 370/458 |
| 2007/0021119 A1* | 1/2007 | Lee et al. ..................... 455/436 |

FOREIGN PATENT DOCUMENTS

| KR | 2003-26109 | 3/2003 |
| KR | 2004-58396 | 7/2004 |
| KR | 2005-2787  | 1/2005 |
| KR | 2005-63535 | 6/2005 |
| KR | 2005-63536 | 6/2005 |
| KR | 2005-94050 | 9/2005 |
| KR | 2006-66521 | 6/2006 |
| KR | 2006-96044 | 9/2006 |
| KR | 2006-98668 | 9/2006 |

* cited by examiner

*Primary Examiner* — Hassan Kizou
*Assistant Examiner* — Charles C Jiang
(74) *Attorney, Agent, or Firm* — Cha & Reiter, LLC

(57) ABSTRACT

A cross-layer optimization method for controlling a bit rate of a video coder/decoder (codec) in video data transmission for wireless devices such as a wireless broadband (WiBro) system terminal that adapts to changing transmission/reception characteristics and usage. The method typically includes checking, by a sender, radio channel state information of a sender side and a receiver side; determining, by the sender, a transmission bit rate of a video codec by using the radio channel state information of the sender side; and adjusting, by the sender, the transmission bit rate of the video codec by using the radio channel state information of the receiver side when a communication network used by a receiver typically based on the type of a communication network being used by the sender.

13 Claims, 2 Drawing Sheets

CROSS-LAYER OPTIMIZATION METHOD FOR CONTROLLING BIT RATE OF VIDEO CODEC IN TRANSMISSION OF VIDEO DATA IN WIBRO SYSTEM

CLAIM OF PRIORITY

This application claims priority under 35 U.S.C. §119 from an application entitled "Cross Layer Optimization Method For Controlling Bit Rate Of Video Codec In Transmission Of Video Data In WiBro System" filed with the Korean Intellectual Property Office on Apr. 23, 2007 and assigned Serial No. 2007-39530, the contents of which are incorporated herein by reference in its entirety.

BACKGROUND OF THE INVENTION

1. Field of the Invention

The present invention relates to wireless systems such as a wireless broadband (WiBro) system used for communication with rapidly changing channel states. More particularly, the present invention relates to a cross layer optimization method for controlling a transmission bit rate of a video coder/decoder (codec) in video data transmission/reception in a wireless broadband (WiBro) system.

2. Description of the Related Art

A typical WiBro system provides a high-speed Internet service, which enables a user to access the Internet and to access various information and contents with a high transmission rate of about 1 Mbps grade through a mobile terminal anytime and anywhere, regardless of whether or not the user is stationary or in motion. Such a WiBro system is a recently developed service, which guarantees a seamless wireless Internet service within a cell radius of 1 Km using a 2.3GHz frequency bandwidth, especially when in motion at a speed of at least 60 Km/H. Such functionality enables a user to use wireless Internet at a relatively inexpensive cost. More recently, a WiBro system has been developed to a level capable of supporting mobility of speeds up to 70 Km/H and a transmission rate of up to 1 Mbps per subscriber. Moreover, if such a WiBro system were to be commercialized, it is expected that the system could support mobility of 100 Km/H and a transmission rate of up to 3 Mbps. Accordingly, when using the Internet via such a WiBro system, a user can enjoy movies whether walking or standing on the street, or traveling in a moving vehicle, and can even play online games and surf the web in a manner similar to access the Internet via a wired indoor network. The WiBro system, which is a one-step forward technology from a wireless local loop (WLL) technology of 2.3 GHz bandwidth, includes a $4^{th}$ generation telecommunication field, and at the same time, has a wider field than that of international mobile telecommunication (IMT) -2000 (that is, $3^{rd}$ generation telecommunications). Therefore, a WiBro system is often referred to as a $3.5^{th}$ generation telecommunication technology.

A WiBro system typically includes characteristics of a conventional mobile terminal, and yet at the same time, includes characteristics of a broadband convergence network (BcN) in which communications, broadcast, and Internet are merged. Therefore, in the system, a variety of services such as online/offline, wired/wireless, and communications/broadcast, etc. are combined with each other.

As described above, mobile Internet using systems such as a WiBro system, is a technology capable of wirelessly receiving high-speed data even while in motion. Also, the mobile Internet basically provides various quality of service (QoS) levels. In other words, according to services provided by an upper layer of a mobile terminal, several QoS parameters (such as transmission bandwidths) change.

During operation of video transmission applications via a WiBro network, such as video telephony, personal broadcast etc., a WiBro system controls a modulation and coding selection (MCS) level and terminal power according to WiBro radio channel characteristic parameters, such as a carrier to interference and noise ratio (CINR), transmission power (Tx Power), etc., and raises the efficiency of the entire data throughput by an algorithm of a scheduler based on the above control.

However, the characteristics of a WiBro system using a wireless network may result in rapidly changing radio channel characteristics, traffic congestion, and a large fluctuation of the number of users within a cell, etc., thereby continuously changing an available bandwidth for transmission/reception. In other words, the WiBro system, differs from a wired network in that physical media characteristics, such as a data transfer rate, can suddenly change according to the characteristics and conditions of wireless media. Moreover, it is very difficult to predict a change in the characteristics, making the available bandwidth at a given moment difficult to predict. Such a change does not cause serious problems in the use of simple Internet search services, but may cause remarkable service degradation in terms of delay and jitter in the use of a multimedia service, such as video.

In addition, in the case where a service provider is required to provide a bandwidth guarantee, rapidly changing radio channel characteristics can cause serious service degradation in terms of QoS. Therefore, as user requirements for multimedia grow with the development of networks, the QoS guarantee has been recognized as an essential consideration in the development of communication systems.

When trying to transmit video data to the other party, a conventional WiBro terminal uses a constant bit rate (CBR) by fixing an output bit rate of a video codec. Accordingly, video data transmitted with the CBR cannot adapt itself to the sender/receiver side radio channel characteristics and WiBro network radio channel characteristic changes due to available bandwidth variations. As a result, when the radio channel characteristics of the sender side transmitting the video data deteriorate, or when the receiver side suffers from poor radio channel characteristics (even though the sender side has good radio channel characteristics), the received images may have serious degradation to image quality, or can be interrupted or even stopped. Moreover, delay and jitter characteristic degradations will become apparent, resulting in user dissatisfaction with the network.

SUMMARY OF THE INVENTION

Accordingly, the present invention has been made in part to solve at least some of the above-mentioned problems occurring in the prior art, as well as to provide at least the advantages described herein below. The present invention provides a cross-layer optimization method for controlling a transmission bit rate of a video codec (coder/decoder), suitably to rapidly changing WiBro radio channel states of either/or both the sender side and the receiver side during video data transmission in a wireless broadband (WiBro) system.

In accordance with an exemplary aspect of the present invention, there is provided a cross layer optimization method for controlling a bit rate of a video coder/decoder (codec) in video data transmission in a wireless broadband (WiBro) system terminal, the method typically including the steps of: checking, by a sender, radio channel state information of sender side and receiver side; determining, by the sender, a transmission bit rate of a video codec by using the radio channel state information of the sender side; and adjusting, by the sender, the transmission bit rate of the video codec by using the radio channel state information of the receiver side when a communication network used by a receiver equals a communication network used by the sender.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION

Hereinafter, exemplary embodiments of the present invention will be described in detail with reference to the accompanying drawings. The exemplary embodiments are provided for illustrative purposes only, and the claimed invention is not limited to the examples provided herein. In the following description of the present invention, a detailed description of known functions and configurations incorporated herein may be omitted to so as not to obscure appreciation of the subject matter of the present invention by a person of ordinary skill in the art.

Figure 1:
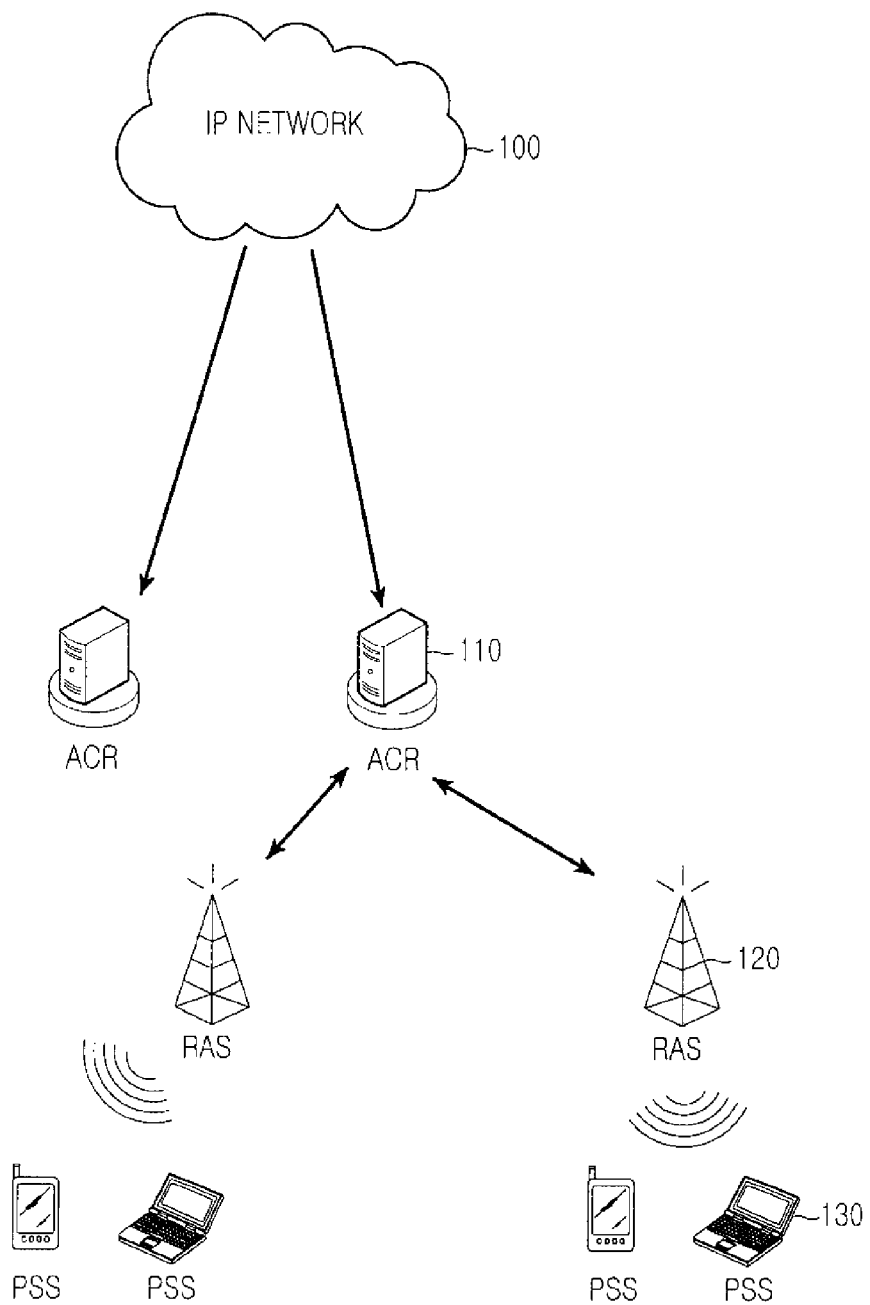
FIG. 1 is a diagram illustrating a general wireless broadband (WiBro) system according to the present invention.

FIG. 1 is a diagram illustrating an example of a general wireless broadband (WiBro) system according to the present invention. First, a general configuration of a WiBro system will be now be described.

As shown in FIG. 1, the WiBro system includes multiple radio access stations (RAS) 120 and multiple access control routers (ACR) 110 controlling the multiple RASs 120 in connection with a network. Also, the WiBro system includes multiple portable subscriber stations (PSS) 130 transmitting/receiving data to/from the multiple RASs 120.

Each RAS 120 typically transmits/receives data to/from the multiple PSSs 130 via a wireless interface at wired network termination. Also, each RAS 120 includes a service area, that is, a cell, assigned thereto, and provides services to the multiple PSSs 130 located within the assigned cell. The multiple PSSs 130 include handheld communication devices, such as personal digital assistants (PDAs), mobile telephones, notebook computers, or any device capable of wireless communication, etc. In addition, the WiBro system may include a home agent (HA, not shown) supporting Internet protocol (IP) mobility of a terminal in a home network, and an authentication, authorization, accounting (AAA) server (not shown) for authenticating a user and a terminal, optionally verifying authorization, and performing an accounting process so as to provide network access and services only to legitimate users.

Bandwidth assignment enabling a WiBro terminal to transmit video data is determined by a scheduler algorithm of media access control (MAC) of a base station (ACR or RAS). A terminal, which is assigned with a bandwidth from a base station (ACR or RAS) by the MAC scheduler, may transmit as much data as can be transmitted according to the assigned bandwidth, and herein, the bandwidth assigned to the terminal is continuously varied according to changing radio channel characteristics and the number of users in a cell, etc.

A method of controlling a bit rate of a video coder/decoder (codec) according to an exemplary embodiment of the present invention preferably includes a cross-layer optimization algorithm. In the cross-layer optimization algorithm, radio channel characteristics of a WiBro network are recognized and estimated, and then a bit rate of a video codec is controlled according to the radio channel state of the sender side and the receiver side.

Figure 2:
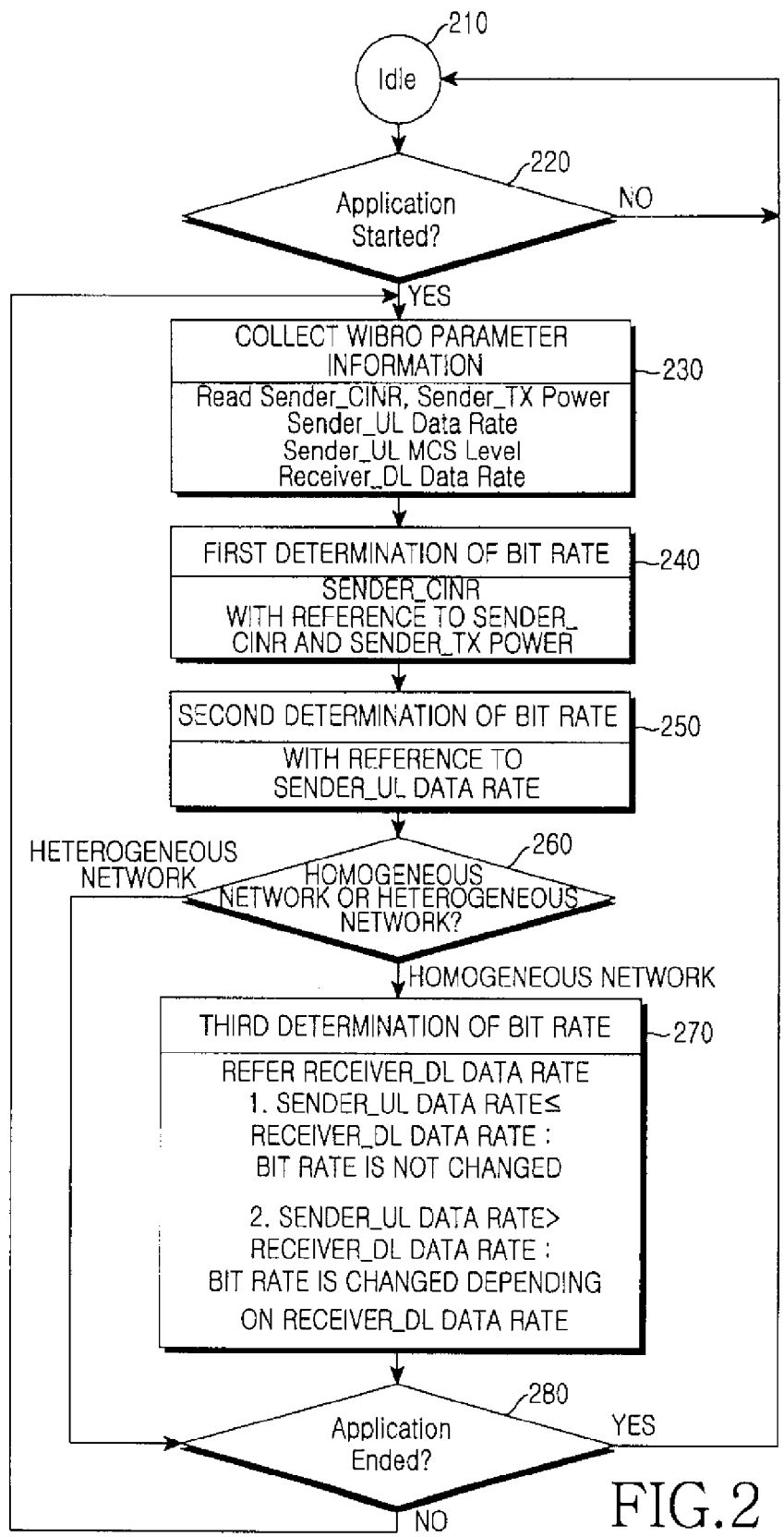
FIG. 2 is a flow diagram illustrating a process for controlling a bit rate of a video coder/decoder (codec) in video data transmission according to an exemplary embodiment of the present invention.

FIG. 2 is an exemplary flow diagram illustrating typical steps of a process for controlling a bit rate of a video codec in video data transmission according to an exemplary embodiment of the present invention.

A process for controlling a bit rate of a video codec according to an exemplary embodiment of the present invention will now be described in detail with reference to FIG. 2.

In step 210, the process is in an idle state. When a WiBro application transmitting video data starts in step 220, the process proceeds to step 230, and a cross-layer optimization algorithm operates. A person of ordinary skill in the art should appreciate that controlling a bit rate of a video codec according to the characteristics of the present invention can be applied broadly to many data transmission applications, particularly video transmissions (such as video telephony, personal broadcast, etc.) requiring real-time (or time very close to the real-time) transmission/reception, and/or application which are sensitive to quality, delay, and jitter characteristics of video data.

In step 230, information on parameters indicating WiBro radio channel characteristics is collected. According to an exemplary aspect of the present invention, reference parameters for determining WiBro radio channel characteristics include several values of a sender, such as a carrier to interference and noise ratio (CINR), transmission power (Tx power), an uplink (UL) data rate and a UL modulation and coding selection (MCS) level, together with a downlink (DL) data rate transmitted from a base station (ACR or RAS) of a receiver to the receiver, and a CINR of the receiver.

In step 240, a first determination of a bit rate of a video codec is performed. In the first determination of the bit rate of the video codec, reference parameters include a CINR, Tx power, and a UL MCS level of the sender side. In other words, the bit rate, which can be output from the video codec, is preferably determined with reference to the CINR, the Tx power, and the UL MCS level of the sender side.

A WiBro terminal periodically reports radio channel characteristic values sensed by the terminal, that is, a CINR and Tx power, to a base station (ACR or RAS). Since a WiBro system uses a time division duplexing (TDD) system, frequency characteristics of a DL and a UL data may be similar to each other. Therefore, when a UL MCS level is determined on the basis of a DL CINR, it is possible to estimate the increase and decrease of a present available bandwidth compared with a previously assigned bandwidth.

However, if frequency characteristics of a DL and a UL are not similar to each other, it is possible to estimate the increase and decrease of a bandwidth based on UL Tx power. A CINR and Tx power are opposite to each other. When it is determined, by a CINR, that there is a terminal in the vicinity of a base station (ACR or RAS), a high MCS level is assigned, and on the other hand, when high Tx power is reported, a low MCS level is assigned. In other words, when characteristics of a DL and a UL are similar to each other, a bandwidth is estimated according to a CINR, and on the other hand, when characteristics of a DL and a UL are different from each other, a bandwidth is estimated according to Tx power.

Also, it is possible to firstly determine a bit rate output by a video codec with direct reference to a UL MCS level.

In step 250, a second determination of the bit rate of the video codec is performed. According to an exemplary aspect of the present invention, a second determination parameter for determining the bit rate of the video codec is a UL data rate. Although a bandwidth is estimated and determined by the first determination of the bit rate in step 240, a UL data rate, which is UL-transmitted with an assigned bandwidth, actually carries more significant weight for a terminal. Therefore, the second determination of the bit rate of the video codec is performed with reference to such a UL data rate.

In step 260, it is determined whether the receiver uses a heterogeneous network or a homogeneous network with respect to a network of the sender. In other words, it is determined that the receiver receiving video data transmitted from the sender via a WiBro network uses the same WiBro network as that of the sender, or a heterogeneous network which is different from that of the sender. If a network of the receiver is the same as that of the sender, the process proceeds to step 270 and performs a third determination of the bit rate of the video codec.

Until the first determination in step 240, and the second determination in step 250, the bit rate of the video codec is determined depending on radio channel characteristics of the sender. However, in step 270, when the receiver side radio channel state is worse than that of the sender side, the transmission bandwidth should be provided in accordance with a receiving bandwidth of the receiver side. Accordingly, the bit rate of the video codec is finally determined on the basis of a DL data rate transmitted from a base station (ACR or RAS) to the receiver. Specifically, when a UL data rate of the sender side is lower than or equal to a DL data rate of the receiver side, the bit rate is preferably controlled as a fixed value without a change, and on the other hand, when a UL data rate of the sender side is higher than a DL data rate of the receiver side, the transmission bit rate is preferably controlled on the basis of the DL data rate of the receiver side.

Also, in step 260, if the receiver uses a heterogeneous network different from a network of the sender, the process proceeds to step 280. When a network of the receiver is different from that of the sender, the receiver does not feed back a parameter for the third determination of the bit rate. Therefore, step 270 for performing the third determination of the bit rate is omitted.

Accordingly, in video data transmission according to an exemplary aspect of the present invention, in the case of homogeneous network transmission/reception, in which both a sender and a receiver use WiBro networks, a transmission bit rate of a video codec is preferably controlled depending on the sender/receiver side WiBro radio channel state. On the other hand, in the case of heterogeneous network transmission/reception, in which a sender uses a WiBro network and a receiver uses another network, a transmission bit rate of a video codec is variably controlled depending on only the WiBro radio channel state of the sender side transmitting video data.

A method of controlling a bit rate of a video codec according to the exemplary embodiment of the present invention is broadly applicable to video transmission applications (such as video telephony, personal broadcast, etc.) requiring real time (or time very close to the real time) of a homogeneous (or heterogeneous) network terminal via a WiBro network.

In addition, the present invention can be realized as various types of hardware, software, special purpose processors, or a combination of such hardware, software, and special purpose processors. However, it is preferred that the present invention is realized as the combination of hardware and software. Moreover, it is desirable for software to be realized as an application program, which is actually realized in a program storage unit. Such an application program can be uploaded and executed by a machine including certain appropriate architecture. The machine is realized on a computer platform including hardware such as at least one central processing unit (CPU), a random access memory (RAM), and an input/output (I/O) interface. The computer platform may also include an operating system and microinstruction codes. Various processes and functions described in the present application may include a part of microinstruction codes, a part of application programs, or a certain combination of the microinstruction codes and application programs, and may be executed by the CPU. Also, other various peripheral units, such as an additional data storage unit and a print unit, may be connected to the computer platform.

It is desirable for some parts of a configuration system and a method shown in FIGS. 1 and 2 to be realized in software, and thus actual connection between system components or between process blocks may be different according to the programming of the present invention.

In the present invention, when a WiBro terminal transmits video data at video data transmission/reception applications requiring real time (or time very close to the real time) via a WiBro network, a transmission bit rate of video is controlled to be variable according to WiBro radio channel state of a sender/receiver. Accordingly, it is possible to improve a peak signal to noise rate (PSNR) of received video, and the characteristics of received information, such as delay and jitter, etc., thereby improving QoS.

While the invention has been shown and described with reference to certain exemplary embodiments thereof, it will be understood by those skilled in the art that various changes in form and details may be made therein without departing from the spirit and scope of the invention as defined by the appended claims. For example, the present invention is not limited to WiBro and can be applied to other types of communication systems. Also, it is within the spirit of the invention and the scope of the appended claims that the order of the bit rate determination shown in the exemplary flowchart of FIG. 2 can be performed in a different order than shown and described.

What is claimed is:

1. A cross-layer optimization method for controlling a bit rate of a video coder/decoder (codec) in video data transmission in a wireless system terminal, the method comprising the steps of:
   (a) checking, by a sender, radio channel state information of a sender side and a receiver side;
   (b) determining, by the sender, a transmission bit rate of a video codec by using the radio channel state information of the sender side;
   (c) adjusting, by the sender, the transmission bit rate of the video codec in accordance with the radio channel state information of the receiver side when a communication network used by a receiver is homogeneous to a communication network used by the sender; and
   (d) determining whether the communication network used by the receiver is heterogenous to the communication network used by the sender, and if so, refraining from adjusting the transmission bit rate determined in step (b).

2. The method according to claim 1, wherein the communication networks used by the sender and the receiver are both wireless broadband (WiBro) networks.

3. The method according to claim 1, wherein the wireless system terminal comprises a wireless broadband (WiBro) terminal.

4. The method according to claim 1, wherein parameters indicating radio channel state information of the sender side comprise a carrier to interference and noise ratio (CINR), a transmission power (Tx power), an uplink (UL) modulation and coding selection (MCS) level, and a UL data rate of the sender.

5. The method according to claim 1, wherein parameters indicating radio channel state information of the receiver side comprise a downlink (DL) data rate of the receiver.

6. The method according to claim 4, wherein step (b) comprises the steps of:
   determining the transmission bit rate by using the CINR, Tx power, and a UL MCS level of the sender side; and
   determining the transmission bit rate by using a UL data rate of the sender side.

7. The method according to claim 1, wherein the radio channel state information of the receiver side used for control of the transmission bit rate of the video codec is fed back to the sender side by the receiver.

8. A cross-layer optimization method for controlling a bit rate of a video coder/decoder (codec) in video data transmission in a wireless system terminal, the method comprising the steps of:
   (a) checking, by a sender, radio channel state information of a sender side and a receiver side;
   (b) determining, by the sender, a transmission bit rate of a video codec by using the radio channel state information of the sender side;
   (c) adjusting, by the sender, the transmission hit rate of the video codec in accordance with the radio channel state information of the receiver side when a communication network used by a receiver is homogeneous to a communication network used by the sender;
   wherein,
   parameters indicating radio channel state information of the sender side comprise a carrier to interference and noise ratio (CINR), a transmission power (Tx power), an uplink (UL) modulation and coding selection (MCS) level, and a UL data rate of the sender;
   parameters indicating radio channel state information of the receiver side comprise a downlink (DL) data rate of the receiver;
   step (c) further comprises comparing the UL data rate of the sender side and the DL data rate of the receiver side, and after the comparison:
   the transmission bit rate is not adjusted when the UL data rate of the sender side is lower than or equal to the DL data rate of the receiver side; and
   the transmission bit rate of the video codec is adjusted by using the DL data rate of the receiver side when the UL data rate of the sender side is higher than the DL data rate of the receiver side.

9. The method according to claim 8, wherein the radio channel state information of the receiver side used for control of the transmission bit rate of the video codec is fed back to the sender side by the receiver.

10. A cross-layer optimization method for controlling a bit rate of a video codec in video data transmission in a wireless terminal, the method comprising the steps of:
   checking, by a sender, radio channel state information of a sender side and a receiver side;
   determining, by the sender, a transmission bit rate of a video codec in accordance with a CINR, Tx power, and a UL MCS level of the sender side;
   determining, by the sender, the transmission bit rate of the video codec in accordance with a UL data rate of the sender side; and
   determining, by the sender, the transmission bit rate of the video codec in accordance with a DL data rate of the receiver side when a communication network used by a receiver is homogeneous to a communication network used by the sender;
   wherein, the step of determining the transmission bit rate of the video codec in accordance with a UL data rate of the sender side includes comparing the UL data rate of the sender side and the DL data rate of the receiver side,
   wherein the transmission bit rate is not adjusted when the UL data rate of the sender side is lower than or equal to the DL data rate of the receiver side; and
   wherein the transmission bit rate of the video codec is adjusted by using the DL data rate of the receiver side when the UL data rate of the sender side is higher than the DL data rate of the receiver side.

11. The method according to claim 10, wherein the wireless terminal comprises a wireless broadband (WiBro).

12. The method according to claim 10, wherein the DL data rate of the receiver side used for control of the transmission bit rate of the video codec is fed back to the sender side by the receiver.

13. A cross-layer optimization method for controlling a bit rate of a video codec in video data transmission in a wireless terminal, the method comprising the steps of:
   checking, by a sender, radio channel state information of a sender side and a receiver side;
   determining, by the sender, a transmission bit rate of a video codec in accordance with a CINR, Tx power, and a UL MCS level of the sender side;
   determining, by the sender, the transmission bit rate of the video codec in accordance with a UL data rate of the sender side;
   determining, by the sender, the transmission bit rate of the video codec in accordance with a UL data rate of the receiver side when a communication network used by a receiver is homogeneous to a communication network used by the sender; and
   determining whether the communication network used by the receiver is heterogeneous to the communication network used by the sender, wherein the transmission bit rate remains unadjusted when the communication network used by the receiver is determined to be heterogeneous to the communication network used by the sender.

* * * * *

UNITED STATES PATENT AND TRADEMARK OFFICE
CERTIFICATE OF CORRECTION

| | | |
|---|---|---|
| PATENT NO. | : 8,189,499 B2 | |
| APPLICATION NO. | : 12/107817 | |
| DATED | : May 29, 2012 | |
| INVENTOR(S) | : Do-Young Joung et al. | |

It is certified that error appears in the above-identified patent and that said Letters Patent is hereby corrected as shown below:

Column 7, Claim 8, Line 29, should read,
--...transmission bit rate of...--

Column 8, Claim 13, Line 46, should read,
--...with a DL data rate of...--

Signed and Sealed this
Thirtieth Day of October, 2012

David J. Kappos
*Director of the United States Patent and Trademark Office*